United States Patent [19]
Tudor et al.

[11] 3,762,557
[45] Oct. 2, 1973

[54] FLOATING SKIMMER

[75] Inventors: Adney J. Tudor; Edward E. Tudor, both of London, Ontario, Canada

[73] Assignee: Watermaster Industries Limited, London, Ontario, Canada

[22] Filed: Aug. 23, 1971

[21] Appl. No.: 173,994

[52] U.S. Cl. .......................... 210/242, 210/DIG. 21
[51] Int. Cl. ............................................. E02b 15/04
[58] Field of Search .......................... 417/61; 415/7; 210/242, DIG. 21

[56] References Cited
UNITED STATES PATENTS

| 3,690,463 | 9/1972 | O'Brien | 210/DIG. 21 |
| 3,701,429 | 10/1972 | Schell | 210/DIG. 21 |
| 3,598,501 | 8/1971 | Stanfield | 210/DIG. 21 |
| 3,642,140 | 2/1972 | Parker | 210/242 |
| 3,534,859 | 10/1970 | Amero et al. | 210/DIG. 21 |
| 3,397,647 | 8/1968 | Daniel | 415/7 |

*Primary Examiner*—Samih N. Zaharna
*Assistant Examiner*—T. A. Granger
*Attorney*—Arne I. Fors et al.

[57] ABSTRACT

A floating surface skimmer particularly adapted for use with a floating pump housed by said skimmer. The skimmer is circular in shape and has a plurality of peripheral radial openings communicating with a central opening in which the pump is housed whereby each of the said peripheral openings acts as a weir. The height of the skimmer above a liquid surface can be adjusted to control the depth of liquid skimmed.

4 Claims, 5 Drawing Figures

PATENTED OCT 2 1973 3,762,557

INVENTORS
ADNEY J. TUDOR
EDWARD E TUDOR
BY
Arne J. Fors
Agent

INVENTORS
ADNEY J. TUDOR
EDWARD E. TUDOR

BY Arne T. Fors

Agents

FLOATING SKIMMER

This invention relates to surface skimmers and is particularly directed to a floating surface skimmer for use with a floating pump for skimming liquids.

Surface skimmers have been designed and constructed for the removal of oil slicks and spills, chemical leakages and, in general, for the removal of any floating substance such as algae, sludge, grease and sewage from the surfaces of liquids. Such known skimmers normally involve the use of a plurality of scoops or baffles mounted on endless conveyor belts or chains, or canvas belts adapted to be wetted by the material to be skimmed, and necessitate large ancillary supporting structures such as barges or the like. Other known surface skimmers, used in conjunction with floating pumps, must rely on the pump flotation for support and have been found not only unstable but also subject to constant adjustment in use.

I have discovered a simple floating structure which is adapted for use in conjunction with a floating pump and which is portable, self supporting in a liquid, efficient in operation, and readily capable of adjustment for an optimum skimming operation.

In accordance with a preferred embodiment of my invention, the skimmer comprises an upper annular section having a central opening and a plurality of peripheral radial openings formed in its undersurface in communication with the central opening, and a lower section having a truncated generally conical or cylindrical portion and a rim substantially coextensive with and adapted to be secured to the underside of the upper section whereby the rim of said lower section forms a weir for each of said upper section radial openings and said truncated generally conical or cylindrical portion of said lower section, together with the central opening formed in the upper section, forms a receptacle for said pump.

It is a principal object of the present invention, therefore, to provide a simple and inexpensive floating, liquid surface skimmer which can be readily adjusted as to depth of liquid to be skimmed.

Another object of the present invention is the provision of a portable, liquid surface skimmer, readily adapted for use with a floating pump, which is reliable and substantially trouble-free in operation.

These and other objects of the invention, and the manner in which they can be attained, will become apparent from the following detailed description taken in conjunction with the accompanying drawings, in which.

Like reference characters refer to like parts throughout the description of the drawing.

Figure 1:
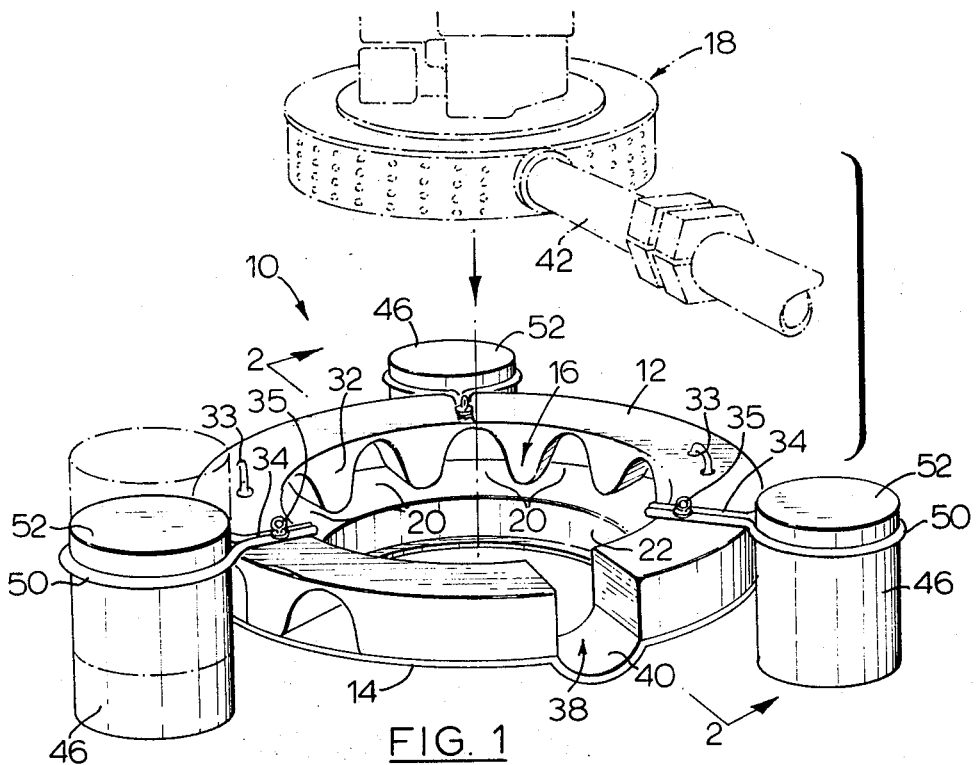
FIG. 1 is a perspective view of a preferred embodiment of the surface skimmer of the present invention in which a side suction pump, illustrated by ghost lines, is shown axially separated from the skimmer.
Figure 2:
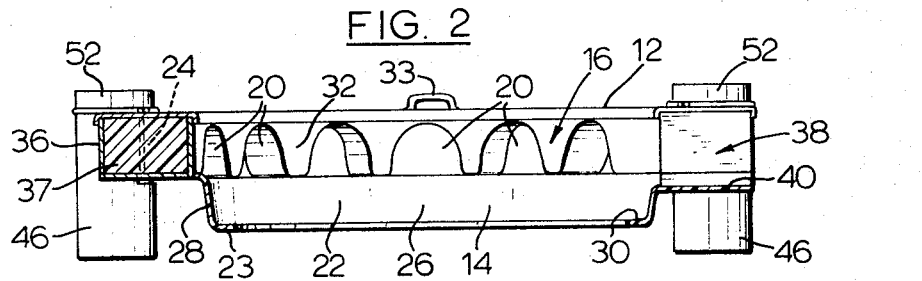
FIG. 2 is a transverse section taken along the line 2 — 2 of FIG. 1.
Figure 3:
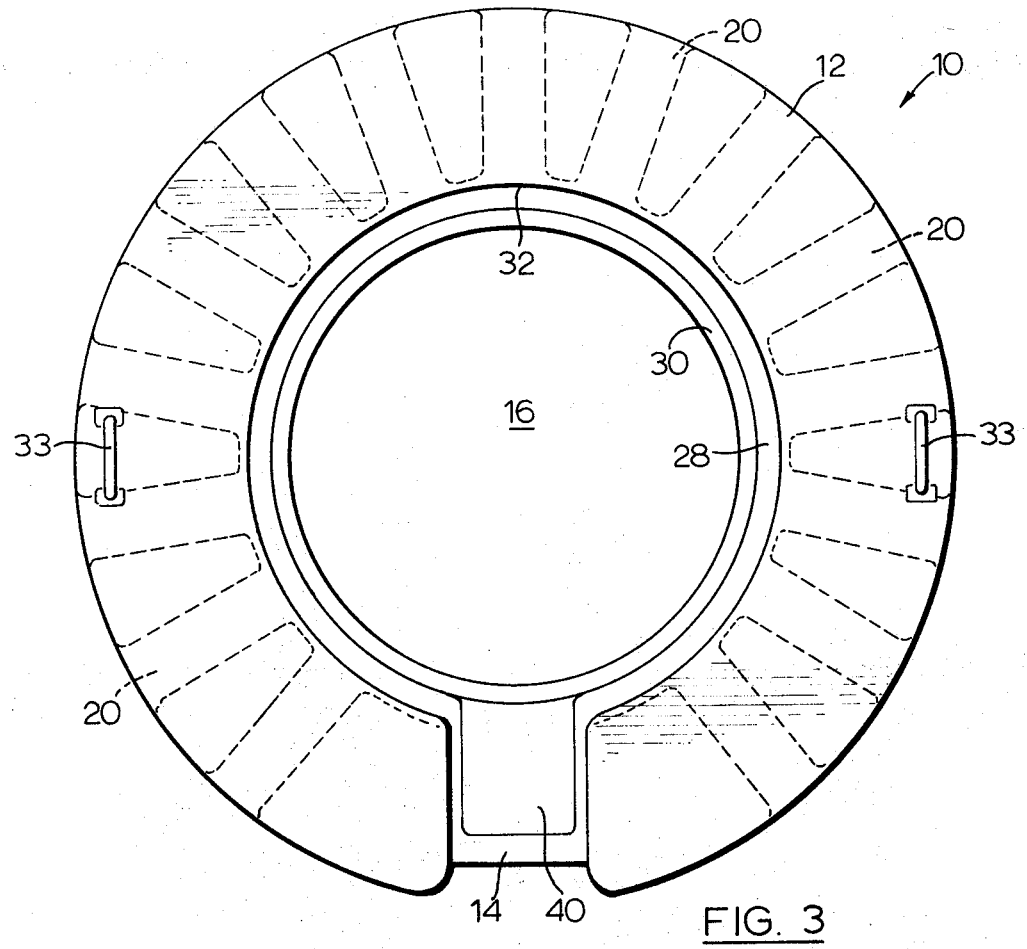
FIG. 3 is a plan view of the skimmer shown in FIG. 1, with flotation devices removed.

With particular reference to FIGS. 1, 2 and 3 of the drawings, there is shown a surface skimmer designated generally by the numeral 10 having an upper annular section 12 and a lower, truncated generally conical or cylindrical section 14. Upper section 12 has a central opening 16 adapted to receive side suction pump 18, shown by ghost lines in FIG. 1. A plurality of peripheral radial openings 20 are formed in the underside of upper section 12 and extend through section 12 in communication with central opening 16, for reasons which will become apparent as the description proceeds.

Lower section 14 comprises conical or cylindrical portion 22 having rim 23 adapted to extend to the periphery of upper section 12 and adapted to be secured to upper section 12 by a plurality of connecting means such as bolts or rivets 24. A receptacle or well 26 is formed in the central portion of lower section 14 by conical or cylindrical wall 28, which is substantially coextensive with the inner wall 32 of the upper section, and a protruding lip defining annular flange 30. Pump 18 is seated on flange 30, effectively closing the bottom of the skimmer, and is secured centrally within the skimmer by overlapping clamp plates 34 held in position by eye bolts 35. Eye bolts 35 and handles 33 permit facile transport of the skimmer.

Opening 38 is formed in upper section 12 and notch 40 in lower section 14 to accommodate the hose 42 of pump 18.

With particular reference now to FIG. 2, upper section 12 comprises an outer shell 36 of a rigid material such as fibre glass reinforced polyester resin and is filled with a foam plastic 37 having the flotation characteristics of urethane. Lower section 14 preferably is formed of a rigid material such as fibre glass reinforced polyester resin.

Figure 4:
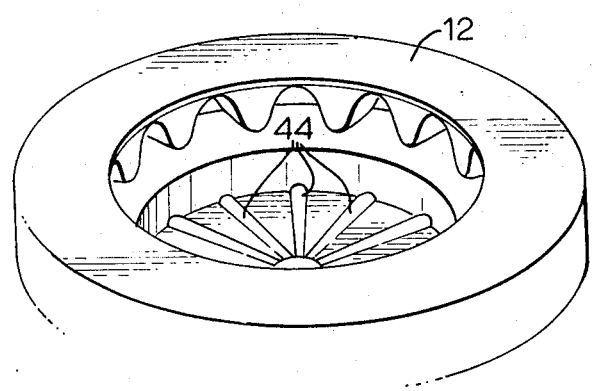
FIG. 4 is a perspective view, partly cut away, of a second embodiment of the present invention showing radial supports in the skimmer closed bottom for a bottom-suction pump.

FIG. 4 illustrates another embodiment of my invention adapted for use with a bottom-suction pump in which the central portion of the skimmer is closed and radial ribs 44 adapted to support the pump while permitting the flow of liquid into said pump.

A plurality of height adjustment flotation devices 46, preferably three in number, are secured to the top of upper section 12 by eye bolts 35 gripping connecting rods 50. Each height adjustment device 46 comprises a rod 50 which defines a circular opening for receiving cylindrical, liquid-displacement flotation cylinders 52 in frictional engagement. The level of skimmer 10 can be adjusted by raising and lowering flotation cylinders 52, as shown by ghost lines in FIG. 1, within the openings of rods 15.

Figure 5:
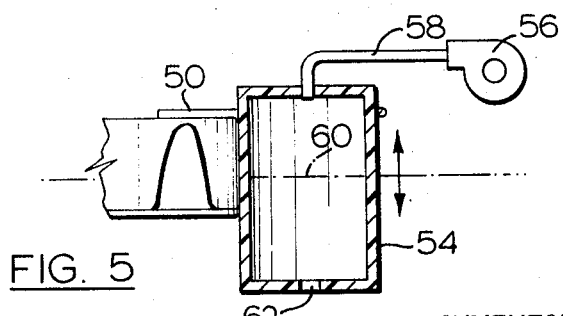
FIG. 5 is a transverse section of a portion of a surface skimmer of the present invention showing the use of an embodiment of height adjustment flotation means.

FIG. 5 illustrates another embodiment of height adjustment device in which at least three open-bottomed cylindrical tanks 54, in communication with a compressor 56 by air lines 58, are rigidly secured to the skimmer in the manner described with reference to FIG. 1 and the level of water in the cylindrical tanks 54 controlled by increasing air pressure to displace water out of bottom opening 62 to raise the height of the skimmer, or by permitting air to escape through air line 58, whereby water enters by way of bottom opening 62 to lower the height of the skimmer.

In operation, a pump such as a floating centrifugal or diaphragm pump is positioned in the cavity formed by central opening 16 and well 26 and locked in place by clamps 34. The assembled unit floats in the liquid to be skimmed, normally water, with the rim 23 submerged a desired level, such as about one-half inch to 1 inch, below the surface of the liquid such that the said rim functions as a weir. The height of the skimmer, and hence the depth of the weir below the surface of the liquid, can be readily adjusted by the height controlling devices 46. As the pump is operated, liquid flows over the several weirs into the pump suction and is discharged through the discharge hose 42 to a receptacle or pond in a remote location.

The present invention provides a number of important advantages. The skimmer or skimmer with pump, can be readily transported by one or two men. The plurality of weirs permits the skimming of a large volume of liquid, in the order of 200 gallons per minute, and the depth of liquid skimmed and the level of the skimmer can be readily and effectively adjusted.

It will be understood of course, that modifications can can be made in the preferred embodiment of the present invention as described hereinabove without departing from the scope and purview of the appended claims.

We claim:

1. A floating surface skimmer suitable for use with a portable pump for skimming a liquid, comprising a floatable upper annular section having a central opening, a plurality of arch-shaped cut outs formed in the underside of said annular section and extending radially from said central opening to the periphery therein, a lower section dismountably secured to the underside of said upper section, said lower section including a central receptacle having a substantially conical or cylindrical truncated wall and a flange portion circumscribing the upper edge of said wall, said flange portion being coterminous with the annular section of said upper section, and at least three flotation cylinders releasably mounted at three equally spaced locations about the annular section and selectively adjustable to vary the height of the periphery of said skimmer floating above the liquid to be skimmed.

2. A floating surface skimmer according to claim 1 in which said upper section includes an opening formed on its upper surface and extending radially from said central opening to its periphery to accommodate a hose connected to the pump when said pump is mounted on said skimmer.

3. A floating surface skimmer according to claim 2 in which said central receptacle has a plurality of radial ribs formed therein for supporting a bottom suction pump.

4. A floating surface skimmer according to claim 2 in which said cylinders are in communication with a supply of air whereby air can be introduced into or exhausted from said cylinders to control the liquid level therein for vertical adjustment of the height of flotation of the skimmer above the liquid to be skimmed.

* * * * *